H. C. JANZEN.
AUTOMATIC ANTISKID CHAIN PLACER AND REMOVER.
APPLICATION FILED MAY 8, 1920.

1,376,771.

Patented May 3, 1921.
3 SHEETS—SHEET 1.

Henry C. Janzen
INVENTOR.

BY

ATTORNEYS

H. C. JANZEN.
AUTOMATIC ANTISKID CHAIN PLACER AND REMOVER.
APPLICATION FILED MAY 8, 1920.

1,376,771.

Patented May 3, 1921.

INVENTOR.
Henry C. Janzen
BY
ATTORNEYS

H. C. JANZEN.
AUTOMATIC ANTISKID CHAIN PLACER AND REMOVER.
APPLICATION FILED MAY 8, 1920.
1,376,771.
Patented May 3, 1921.
3 SHEETS—SHEET 3.
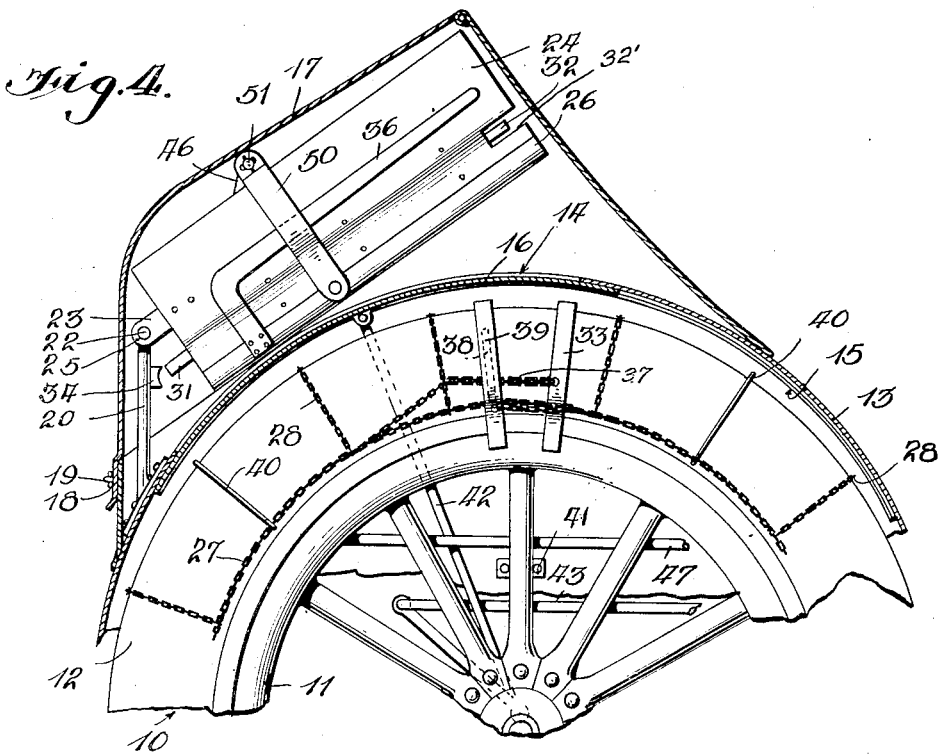
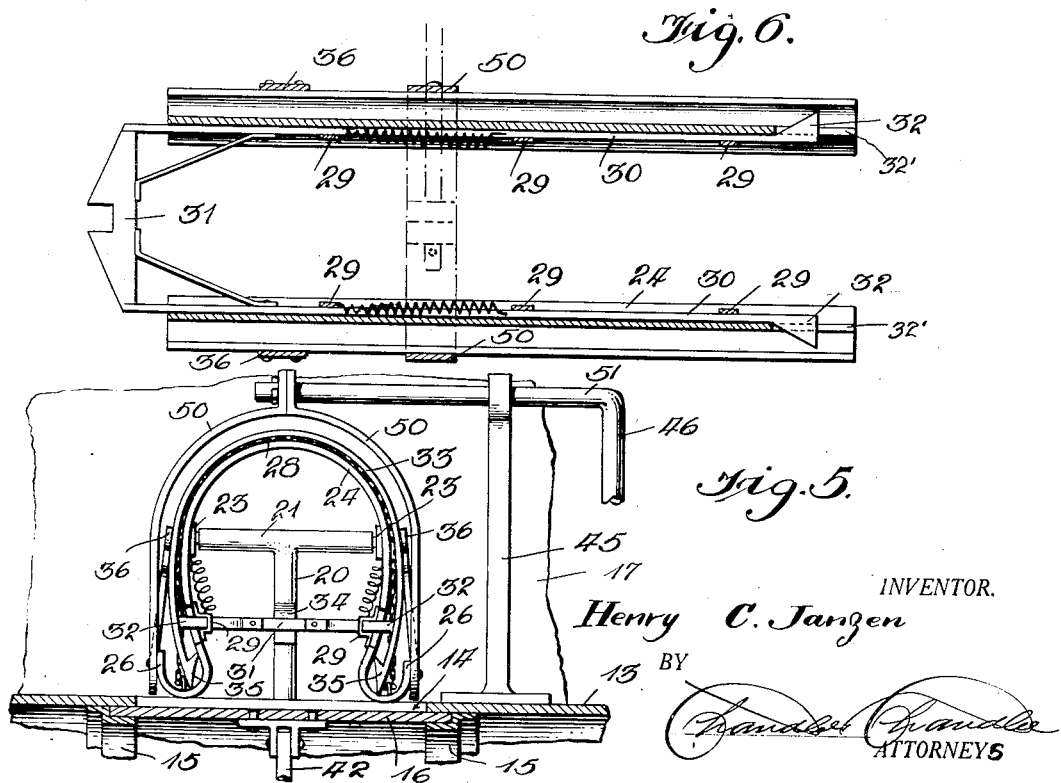
INVENTOR.
Henry C. Janzen
BY
ATTORNEYS

UNITED STATES PATENT OFFICE.

HENRY C. JANZEN, OF JANSEN, NEBRASKA.

AUTOMATIC ANTISKID-CHAIN PLACER AND REMOVER.

1,376,771.     Specification of Letters Patent.     Patented May 3, 1921.

Application filed May 8, 1920. Serial No. 379,850.

*To all whom it may concern:*

Be it known that I, HENRY C. JANZEN, a citizen of the United States, residing at Jansen, in the county of Jefferson, State of Nebraska, have invented certain new and useful Improvements in Automatic Antiskid-Chain Placers and Removers; and I do hereby declare the following to be a full, clear, and exact description of the invention, such as will enable others skilled in the art to which it appertains to make and use the same.

This invention relates to new and useful improvements in attachments for automobiles and particularly to anti-skid chains for the wheels thereof.

The principal object of the present invention is to provide a novel and improved anti-skid chain holder which is operable from the driver's seat to apply the chain to the rear wheel while the automobile is in motion.

Another object is to provide a novel and improved device of this character by means of which the anti-skid chain is properly and securely engaged around the wheel, and the ends of the chain automatically locked against displacement.

Another object is to provide a novel and improved automatic anti-skid chain placer and remover in which the chain is conveniently and compactly carried, when not in use, and which is held against rattling or being displaced.

Other objects and advantages will be apparent from the following description when taken in connection with the accompanying drawings.

In the drawings:

Fig. 4 is a view similar to that of Fig. 2, after the chain has been applied to the wheel, and the ends thereof properly locked together, and after the chain holder and placer has been elevated.

Fig. 5 is an enlarged vertical transverse sectional view through the chain holder, in its elevated position, and the surrounding portions of the mud-guard, showing the means within the holder for pushing the first spring clip onto the wheel, and the springs for holding the chain from rattling when not in use.

Fig. 6 is an enlarged horizontal longitudinal sectional view through the holder, just above the chain pushing device, on the line 6—6 of Fig. 3.

Figure 1:
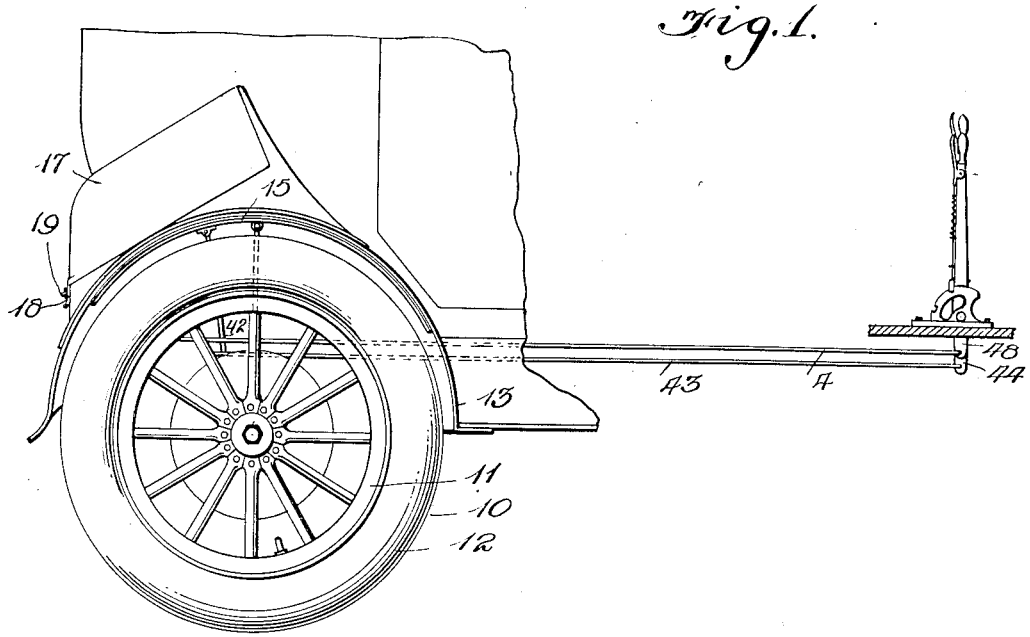
Figure 1 is a side elevation of a portion of an automobile showing the housing for containing the automatic chain holder and placer.
Figures 7, 8:
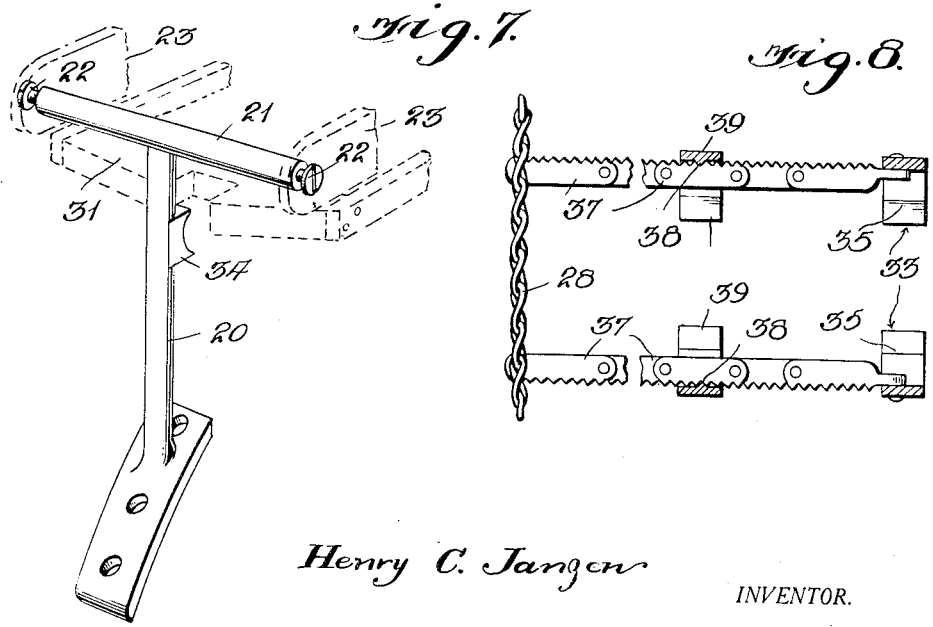
Fig. 7 is a detail perspective view of the pivotal mounting for the chain holder and placer.
Fig. 8 is a detail view of the interlocking ends of the chain, partly in section.
Figure 2:
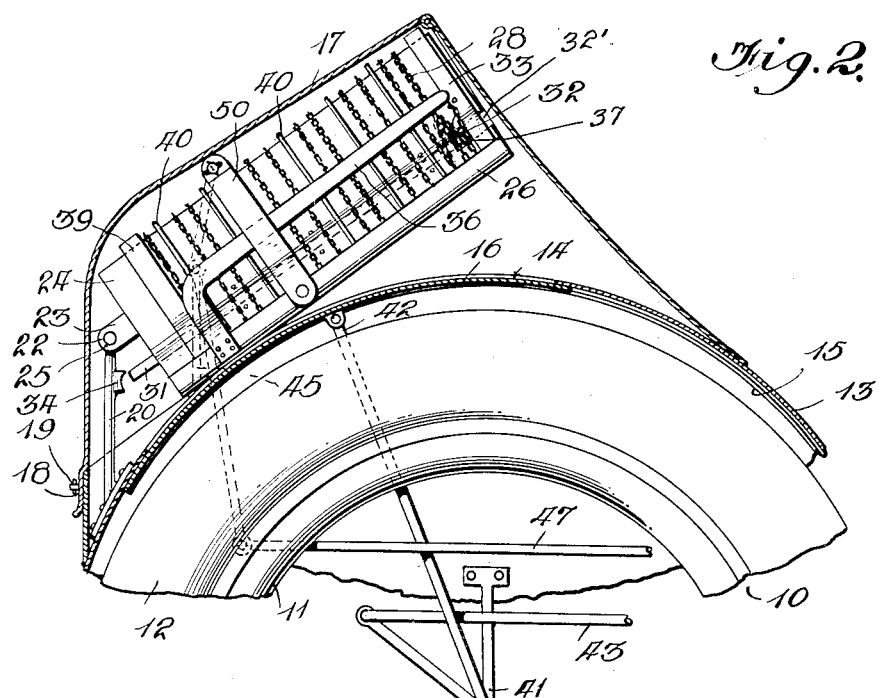
Fig. 2 is a similar view with the casing or housing, and a portion of the rear mud-guard broken away to show the chain holder in normal elevated position.

Referring particularly to the accompanying drawings, 10 represents the rear wheel of an automobile, having the rim or felly 11 and the tire 12, while 13 represents the mud-guard curved over the said wheel. Formed in the upper portion of the mud-guard is a longitudinally extending slot 14, at the opposite longer sides of which are mounted guides 15 for the slidable support of the curved plate 16, which is arranged to be moved into and out of position to close the said slot. Hinged to the mud-guard, at the forward end of the slot 14, is a hood or cover 17, the adjacent portion of the guard, forwardly of the slot being elevated slightly in continuation of the housing for the chain placer, which will be later described. A latch 18 is carried by the free end of the hood for engagement with a keeper 19, on the guard, and at the rear end of the slot 14.

Figure 3:
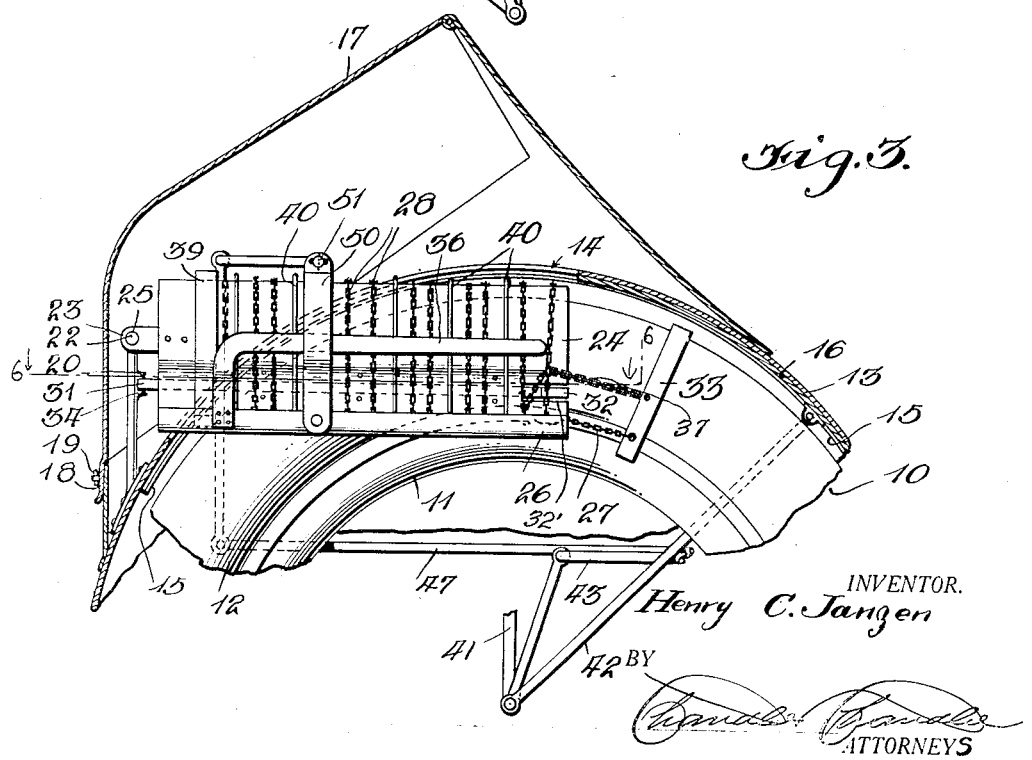
Fig. 3 is a view somewhat similar to that of Fig. 2, but showing the chain placer in lowered position, and with the first spring clip engaged with the tire and rim.

Mounted on the guard, slightly in rear of the slot 14 is a post 20 having a laterally extending shaft 21 disposed through the upper end thereof, said shaft having heads 22 on its opposite ends. Engaged with the ends of the shaft 21 are the arms 23, carried by an elongated and inverted trough-shaped member 24, which forms the body of the chain holder and placer. These arms have eyes 25 in their outer ends which are engaged on the heads 22 when the arms are disposed in vertical position, and pivotally engage on the shaft inwardly of the heads, when swung down toward a horizontal position, whereby said arms are maintained on the shaft, and are permitted a pivotal movement thereon. The longer marginal edges of the body 24 are turned upwardly, as shown at 26 to form gutters in which the longer side chain members 27, of the chains 28 are arranged to rest, when the chain is properly disposed on the holder, and not in use. The cross chains of the anti-skid chains extend upwardly and over the curved arch of the body 24. Secured within the member 24 are a series of guide loops 29, in which are slidably engaged the legs 30 of the yoke 31, said yoke being arranged to extend longitudinally within the member 24. The forward ends of the legs are formed with outwardly directed feet 32 which are arranged to slide in the open-ended slots 32' formed in the sides of the forward end of the member 24, and to project therethrough. These feet, when the anti-skid chain is disposed on the member 24, are disposed rearwardly of the first spring clip 33 of the chain. On the post 20 there is mounted a block 34 against which the bight portion of the yoke 31 is arranged to engage when the member 24 is lowered into the position of Fig. 3, to push the first spring clip 33 from the body onto the tire and rim. The spring clip is approximately circular in outline and is arranged to embrace the tire and the rim, and has the projections 35 on the inner faces of its legs for engagement beneath the rim. Secured to the outer face of the member 24, and extending longitudinally on opposite sides thereof, are the spring fingers 36 which bear on the chain, when the chain is properly supported on the said member, to hold the chain against rattling, while the automobile is in motion. Connecting the spring clip 33 with the next adjacent cross chain of the anti-skid chain, are the short longitudinal chains 37, which have ratchet teeth on their outer faces for engagement by the inner ribs 38, formed on the legs of the spring clip 39, on the other end of the anti-skid chain. At regularly spaced intervals along the anti-skid chain there are secured smaller spring clips 40.

Secured on the outer face of the body of the automobile is a bracket 41 on which is pivotally supported a lever 42. The outer end of the lever is operatively engaged with the before mentioned sliding plate 16, while the inner end is pivotally connected to a link 43, which extends forwardly to a position adjacent the driver's seat, and is pivotally connected to the lower end of an operating lever 44. This lever 44 is pivotally supported within convenient reach of the driver, so that he may swing the lever on its pivot to move the plate 16 into and out of slot closing position.

Mounted on the mudguard, at one side of the slot 14, is a bearing bracket 45 which supports a rock shaft 46, said shaft having a crank arm 47 on one end which is connected to a second lever 48, mounted adjacent the lever 44, by means of the link 49. Secured pivotally to opposite sides of the member 24, and adjacent the lower or gutter portion thereof, are the upwardly and inwardly curved members 50, said members being spaced from the member 24 to permit the anti-skid chain to readily slide therebeneath. The upper ends of the members 50 are perforated to receive the crank arm 51, formed on the other end of the rock shaft 46.

Coil springs are connected to the legs of the yoke 31, and to the adjacent guides 29, for restoring the yoke to retracted position within the member 24, when said member is in elevated position, said springs being put under tension when the member 24 is swung down into chain placing position, as will readily be seen.

The parts being in the position shown in Fig. 1, and it is desired to apply the chains to the rear wheels, the driver swings the lever 44 to move the plate 16 forwardly and thus uncover the slot 14, in the mudguard. It will, of course, be understood that the mechanism hereinbefore described will be duplicated on the other rear wheel of the automobile.

The movement of the lever 44 causes the movement of the plate 16 from beneath the slot 14, and thus provides an opening through which the chain holder 24 will be permitted to move. The other lever 48 is then moved on its pivot to rock the shaft 46, with the result that the forward end of the member 24 will be swung downwardly into straddling relation to the tire and rim of the wheel. As the member 24 swings down the rear end of the yoke 31 will engage with the block 34 of the post 20 and be thus moved forwardly in the member 24, with the result that the feet 32 will push the first spring clip 33 onto the wheel. The resiliency of the clip will cause the same to firmly grip the tire and rim, so that as the wheel rotates, while the automobile is moved slowly forward, the chain will be gradually drawn from the member 24, the successive spring clips of the chain embracing the tire and rim. As the last spring clip 39 is drawn from the member 24, its ribs will engage with the teeth of the short chains 37, and be thus locked against disengagement, the entire chain being thus properly disposed around the wheel. In view of the fact that the member 24 is of such a width as to hold the spring clips distended to a size greater than the tire and rim, the clip 33 will readily pass the clip 39, before the latter clip is detached from the member 24. To remove the chains from the wheels it is only necessary to spring the clip 39 open to permit the disengagement thereof from the ratchet chains 37. The chain is then cleaned and slipped onto the member 24, the clip 33 being placed thereon first, as will be understood, and moved to a position forwardly of the feet of the legs of the yoke 31.

After the chain has been properly placed on the wheel, the other lever 48 is rocked to lift the member 24 above the slot 14, after which the lever 44 is moved to slide the plate 16 into position to cover the slot of the mud-guard.

When replacing the chain on the member 24, the hood or cover 17 is raised, as will be understood.

There is thus provided a novel and improved device whereby the occupant of an automobile can easily and quickly apply the anti-skid chains to the rear wheels of the automobile without the necessity of getting out of the car, and handling muddy chains, or getting in a muddy place in a road or street.

What is claimed is:

1. An anti-skid chain placer comprising a tiltable chain holder, a chain removably carried by the support and having arcuate wheel gripping clips normally distended into spread condition by the holder, means for tilting the support to dispose one end in straddling relation to the tire and rim of a wheel, and means for pushing one of the clips from the holder to contract into embracing engagement with the tire and rim.

2. An anti-skid chain placer comprising a chain holder tiltable to dispose one end in straddling relation to a tire and rim of a wheel, an anti-skid chain mounted on the holder and including a series of tire and rim embracing resilient arcuate clips normally flexed into spread condition by the holder, a longitudinally slidable means on the holder normally engaging with the legs of the endmost of the clips, and means for moving the slidable means to slide the said clip from the holder to permit the clip to contract into embracing engagement with the tire and rim of a wheel, simultaneously tilting the holder.

3. The combination with the mudguard and rear wheel of an automobile, said mud-guard having an elongated opening therein over said wheel, of a tiltable chain holder mounted for movement through said opening to dispose one end in straddling relation to the tire and rim of the wheel, an anti-skid chain including terminal arcuate spring clips normally held in distended condition by the holder and arranged for sliding movement from the holder to permit the clips to automatically contract onto the tire and rim, means on the mudguard for movably supporting the tiltable holder, and a sliding pushing means on the tiltable holder operable against the means for supporting the tiltable holder upon movement of the latter to push one end of the anti-skid chain from the holder and permit the clips to automatically contract into embracing relation to the tire and rim.

4. An anti-skid chain placer including a support, a chain holder in the form of an inverted channel mounted for tilting movement on the support to dispose one end thereof in straddling relation to the tire and rim of a wheel, said holder having its longer marginal edge portions turned upwardly and outwardly to form channels for supporting the side chains of an anti-skid chain, the cross chains being supported across the arch of the channel member, arcuate spring clips having their legs secured to the said side chains and held in distended condition across the arch of the holder, and means for pushing the spring clips from the holder into embracing relation to the tire and rim of a wheel.

5. The combination with a mud-guard and rear wheel of an automobile, the said guard having an elongated opening therein, a post mounted on the guard at one end of the opening, an elongated and inverted trough-shaped member pivotally mounted on the support for movement through said opening and into straddling relation to the tire and rim of the wheel, an anti-skid chain disposed on the trough-shaped member for sliding movement onto the tire and rim of the wheel, a slidable yoke mounted in the trough-shaped member and having feet on the ends of the legs thereof, and a spring clip carried by each end of the chain and arranged to be pushed from the trough-shaped member into embracing relation to the tire and rim by the said feet, upon tilting movement of said member.

6. In an anti-skid chain placer comprising, in combination with the mud-guard of an automobile which has an elongated opening, and the rear wheel of the automobile, of a post mounted on the guard at the rear end of the opening, an inverted trough pivotally supported on the post for tilting movement through the opening and into straddling relation to the tire and rim of the wheel, a skid chain disposed on the trough for sliding movement onto the tire and rim, said chain including terminal spring clips for embracing engagement with the tire and rim, a longitudinally slidable yoke in the trough and having feet for pushing one of the terminal clips from the trough and into embracing engagement with the tire and rim upon tilting movement of the trough and engagement of the yoke with the post, means for tilting the trough, and means on the chain for interlocking engagement of the ends thereof.

In testimony whereof, I affix my signature, in the presence of two witnesses.

HENRY C. JANZEN.

Witnesses:
R. W. MURRAY,
B. O. KROEKER.